Patented Jan. 3, 1933                                        1,892,728

UNITED STATES PATENT OFFICE

HERMANN HAGENEST, OF WIESDORF-ON-THE-RHINE, AND FRIEDRICH WILHELM STAUF, OF COLOGNE-DEUTZ, GERMANY, ASSIGNORS, BY MESNE ASSIGNMENTS, TO WINTHROP CHEMICAL COMPANY, INC., OF NEW YORK, N. Y., A CORPORATION OF NEW YORK

CUPRIC CYANIC COMPOUND AND PROCESS FOR ITS MANUFACTURE

No Drawing. Application filed August 24, 1929, Serial No. 388,259, and in Germany September 3, 1928.

The present invention concerns a new cupric cyanic compound, more particularly it relates to a compound of the formula $CuNH_3(CN)_2$ and to a process for its manufacture.

It is known that the compounds of monovalent copper with hydrocyanic acid are particularly stable in contradistinction to those of divalent copper. Thus, for example, from a cupric salt solution and potassium cyanide there is obtained, not as would be expected, cupric cyanide, but a mixed cuprocupric cyanide, which on heating gives off cyanogen gas very readily, leaving the stable white cuprous cyanide.

In accordance with the present invention a new compound of hydrocyanic acid with divalent copper of the above identified formula can be easily obtained. The process of manufacture in accordance with one feature of this invention is by treating an aqueous solution of a salt of the hydrocyanic acid with ammonia and then adding to the mixture thereby produced and advantageously at a low temperature, the requisite quantity of a cupric salt. The proportions of quantity in which the three initial compounds react upon each other are 1 mol of a cupric salt, 1 mol of ammonia and 2 mols of cyanogen in the form of a water soluble salt of the hydrocyanic acid. Accordingly the best yields are obtainable when the starting materials are used in the quantities indicated above. The temperature employed will also influence the yields, best results are obtainable when working at a low temperature such as, for example, between about 0° C. and 20° C. When working at higher temperatures, the yield will be unsatisfactory because cyanogen and ammonia evaporate. In this manner a green colored ammine compound of divalent copper with hydrocyanic acid, which is nearly insoluble in water, is precipitated. After filtering and drying, a stable compound is obtained, which does not decompose even at 100° C. and which in consequence of its copper content and high cyanogen content, and also on account of its marked dusting properties, is particularly suitable as a medium for combating insect pests.

The invention is illustrated by the following examples, but is not restricted thereto:—

*Example 1:*—250 parts by weight of crystallized copper sulfate are dissolved in 600 parts by weight of water and mixed with 180 parts by weight of an aqueous solution of ammonia of 10% strength. A solution of 130 parts by weight of potassium cyanide in 150 parts by weight of water is added while cooling with ice, and a greenish colored compound of the constitution of a monamminecupricyanide is obtained. The yield amounts to 95% of the theory.

*Example 2:*—130 parts by weight of potassium cyanide are dissolved in 150 parts by weight of water and mixed with 180 parts by weight of an aqueous solution of ammonia of 10% strength. By adding a solution of 250 parts by weight of crystallized copper sulfate in 600 parts by weight of water while cooling, a greenish colored compound of the constitution of a monammine-cupricyanide will be obtained. The yield amounts to 95% of the theory.

We claim:—

As a new product the compound of the formula:

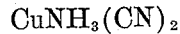

$$CuNH_3(CN)_2$$

being a stable green powder, nearly insoluble in water.

In testimony whereof we have hereunto set our hands.

HERMANN HAGENEST.   [L. S.]
FRIEDRICH WILHELM STAUF.   [L. S.]